United States Patent
Mueller et al.

[11] Patent Number: 5,445,893
[45] Date of Patent: Aug. 29, 1995

[54] PH CONTROL POLYMER

[75] Inventors: Walter B. Mueller, Inman, S.C.;
Cynthia L. Ebner, New Market;
William P. Roberts, Columbia, both of Md.

[73] Assignee: W.R. Grace & Co.-Conn, Duncan, S.C.

[21] Appl. No.: 44,850

[22] Filed: Apr. 8, 1993

Related U.S. Application Data

[63] Continuation-in-part of Ser. No. 828,319, Jan. 30, 1992, abandoned.

[51] Int. Cl.⁶ .................................. B32B 27/00
[52] U.S. Cl. .................... 428/500; 428/349; 428/516; 428/522
[58] Field of Search ............ 428/349, 516, 522, 500

[56] References Cited

U.S. PATENT DOCUMENTS

| | | | |
|---|---|---|---|
| 3,365,520 | 1/1968 | Foster et al. | 260/897 |
| 3,801,551 | 4/1974 | Bohme | 526/317 |
| 3,900,635 | 8/1975 | Funderburk, Jr. et al. | 428/213 |
| 4,181,127 | 1/1980 | Linsky et al. | 128/155 |
| 4,311,655 | 1/1982 | Siadat | 264/22 |
| 4,346,196 | 8/1982 | Hoh et al. | 525/196 |
| 4,352,850 | 10/1982 | Yamamoto et al. | 428/214 |
| 4,401,536 | 8/1993 | Lundell et al. | 204/159 |
| 4,532,189 | 7/1985 | Mueller | 428/516 |
| 4,539,263 | 9/1985 | Hoh | 428/500 |
| 4,599,276 | 7/1986 | Martini | 428/520 |
| 4,606,922 | 8/1986 | Schirmer | 426/412 |
| 4,643,926 | 2/1987 | Mueller | 428/35 |
| 4,726,997 | 2/1988 | Mueller et al. | 428/480 |
| 4,762,748 | 8/1988 | Oberle | 428/349 |
| 4,803,102 | 2/1989 | Raniere et al. | 428/35 |
| 4,857,408 | 8/1989 | Vicik | 428/474 |
| 4,898,784 | 2/1990 | Sanders et al. | 428/412 |
| 4,948,671 | 8/1990 | Hattori et al. | 428/411 |
| 4,963,427 | 10/1990 | Botto et al. | 428/215 |
| 5,023,121 | 6/1991 | Pockat et al. | 428/36 |
| 5,126,198 | 6/1992 | Schinkel et al. | 428/349 |
| 5,132,184 | 7/1992 | Closson, Jr. | 428/519 |

FOREIGN PATENT DOCUMENTS

0444954A2 9/1991 European Pat. Off.

Primary Examiner—Edith Buffalow
Attorney, Agent, or Firm—Thomas C. Lagaly; Mark B. Quatt

[57] ABSTRACT

The present invention is directed to a film suitable for packaging medical solutions and other pH sensitive products. Product pH is controlled by including an ionomer resin blended with a vinyl carboxylate copolymer in a film layer or adhesive. Alternatively, the ionomer may be present as either a core layer, strength layer, or other distinct layer positioned between the sealant layer and the vinyl carboxylate copolymer containing layer.

4 Claims, 1 Drawing Sheet

PH CONTROL POLYMER

CROSS REFERENCE TO RELATED APPLICATION

This application is a Continuation-In-Part of application Ser. No. 828,319, filed Jan. 30, 1992 now abandoned.

FIELD OF THE INVENTION

This invention relates generally to thermoplastic films, and in particular to autoclavable flexible films suitable for the packaging of medical solutions and associated tubing. The invention also relates to a method and means of controlling pH in products packaged in materials having vinyl carboxylate copolymers.

BACKGROUND OF THE INVENTION

Medical pouches are typically made of a highly plasticized polyvinyl chloride (PVC). More recently, it has been proposed that such pouches be constructed of a flexible film material, as described in U.S. Pat. No. 4,643,926 to Mueller, which contains one or more layers of film including a vinyl carboxylate copolymer which enhances the radio-frequency (RF) sealability of the film. U.S. Pat. No. 4,599,276 to Martini discloses the copolymer as used in making such films and the two cited patents are herein incorporated by reference. The above referenced patents represent important steps forward in the art of providing a safe versatile autoclavable medical solution packaging material which can be RF sealed into a pouch. Such pouches are resistant to cracking and embrittlement while remaining flexible and resistant to stress. They also offer these advantages without the need for PVC in the film.

However, it has been found that vinyl carboxylate copolymer resin, such as ethylene vinyl acetate copolymer (EVA), used to enhance the RF sealability of the film, can produce acid extractables such as acetic acid following a typical autoclave sterilization procedure. These acid groups may migrate into the aqueous contents of the medical pouches, causing an undesirable pH shift of the contents. In some cases, this can result in shortening the life of the pouch contents as well as precluding certain solutions from use in such pouches.

In accordance with the invention, we have found that vinyl carboxylate copolymers such as EVA can be used to advantage in films, especially flexible films for medical applications, while at the same time reducing the pH shift problem described above. This is accomplished by including in the film structure an alkali metal ionomer.

SUMMARY OF THE INVENTION

It is thus an object of this invention to provide a pouch which has little or no effect on the pH of the enclosed product.

It is a further object of this invention to provide a pouch with a pH controlling film layer.

It is a still further object of this invention to provide a pouch which prevents or impedes the migration of acid into the enclosed contents.

It is a still further and more particular object of this invention to provide a method of manufacturing a pouch with the characteristics described above.

These as well as other objects of the invention are provided by a film having a layer of alkali metal ionomer, which can be a further neutralized, or hybrid metal ionomer, derived from ethylene acrylic or methacrylic acid (EAA or EMAA)-containing polymers. This layer may be present as a distinct film layer, and/or incorporated into a film layer containing the vinyl carboxylate copolymers, the source of the undesired acid extractables, to neutralize the extractables before they migrate into an enclosed pH sensitive product such as intravenous solution.

DETAILED DESCRIPTION

Figure 1:
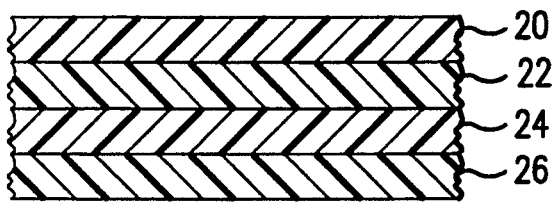
FIG. 1 is a schematic cross section of a four layer film made in accordance with the invention.

In accordance with this invention, it has been found that ionomers can be employed in the manufacture of medical storage pouches so as to neutralize undesirable soluble acidic compounds produced during the sterilization of the pouch and its contents. The ionomers are derived from copolymers of unsaturated carboxylic acids or anhydrides (e.g., acrylic acid, methacrylic acid, maleic anhydride, etc.), or EMA. Alkali metal ionomers based on sodium or potassium are particularly useful in connection with the present invention. Ionomers can also be made with starting materials such as Primacor 5990 (Dow), which is an ethylene acrylic acid copolymer having about 2.8 meq (milliequivalents) carboxylic acid groups per gram of resin and a melt index of 1300.

In accordance with this invention, it has also been found that the ionomer resin can be further refined by neutralizing 60–100% of the acid groups with a suitable base. Preferable bases are NaOH and KOH, which produce Na+ and K+ ions, respectively. It has been found that a high degree of neutralization is advantageous in increasing the effectiveness of the ionomers to act as scavengers for acidic extractables such as acetic acid.

It has also been found that the effectiveness of ionomers can be increased by the formation of hybrid ionomers, i.e., ionomers reacted with a hydroxide base whose positive ion component differs from that present in the unreacted ionomer. In other words, e.g. a sodium ionomer can be further reacted with a non-sodium base such as KOH, zinc ionomers further reactivated by reactive extrusion with NaOH, etc.

The ionomer resin, whether of commercial grade, more highly neutralized, or hybridized as described above, is incorporated into a mono- or multi-layer film which contains a vinyl carboxylate copolymer resin. The vinyl carboxylate copolymer typically serves the function of enhancing the RF sealability of the film, although it can and does serve other functions as well. The ionomer resin can be blended with the vinyl carboxylate copolymer during or prior to formation of the film layer. Alternatively, the ionomer may be present in a different layer from the vinyl carboxylate copolymer as long as the ionomer is disposed somewhere between the vinyl carboxylate copolymer and the surface of the film which becomes the inner bag or pouch surface (sealing layer), so that it can scavenge acidic materials before they enter the pouch interior.

While not wishing to be bound by any particular theory, the scavenging is believed to occur by a favorable proton transfer from carboxylic acid extractables (e.g., acetic acid) to a carboxylate group on the ionomer, which results in the conversion of the acid extractable to the corresponding alkali metal salt. The alkali metal salt may be itself extractable, but is no longer acidic and therefore does not cause a drop in pH in the extracting medium. The amount of ionomer required and its location(s) are determined i.a. by the amount of acid produced as well as the degree of ionomer neutralization. Thus, the total alkali metal content present in the film should exceed the amount of acid to be scavenged. In the practical sense, the effective amount is determined as that amount which is sufficient to provide pH stabilization or a sufficient reduction in pH shift, in the extracting medium.

The effective amount may be controlled i.a. by the type of ionomer selected, the thickness of the ionomer film layer, the degree of ionomer neutralization, the base used to neutralize the ionomer, as well as the percentage of ionomer which comprises a film layer.

Having generally described the invention, the following specific examples are given as a further illustration thereof.

EXAMPLE 1

Solution Preparation of 90% Neutralized K-P5990 Ionomer

Water (172 lbs), potassium hydroxide (KOH) (8.2 lbs. of 85% reagent), and an ethylene acrylic acid copolymer (Primacor 5990) (50 lbs.) were sequentially charged into an agitated stainless steel 30-gallon Pfaudler clamp top reactor which was sealed and heated at 100° C. for 8 hours.

The resulting aqueous solution was then air dried to a clear resin (the 90% neutralized potassium ionomer of P5990) and ground into small pellets.

EXAMPLE 2

Reactive Processing of K-P5990 Ionomer (76% neutralization)

Twelve wt. % of KOH (87% pure) was dry mixed with 88 wt. % Primacor 5990, ethylene acrylic acid resin. The blend was run through a Brabender conical twin screw extruder at 220° C., torque 4–5,000. Large oscillations in torque were noted.

EXAMPLE 3

Reactive Processing of K-P5990 Ionomer with EVA (70% neutralization)

Eleven (11) wt. % KOH (87% pure) was dry mixed with 89 wt. % of Primacor 5990. This mixture was cut 90:10 with a vinyl carboxylate copolymer (EVA) (Elvax 3182-2) as the 10% component. The resultant EVA and ionomer mixture was found to extrude consistently with a steady torque and a homogeneous extrudate. Twelve lbs. of material were successfully extruded at 160° C. at a rate of 3–5 lbs./hour.

EXAMPLE 4

Preparation of Multilayer Film (2.5% Ionomer)

2.5% of the 90% neutralized K-Primacor 5990 ionomer (from Example 1) was blended with 97.5% of Elvax 3182. This formed the core layer (layer 22 of FIG. 1) of a multilayer coextruded film having a sealant layer 20 of 80% PLTD 665, an ethylene propylene copolymer (EPC); and 20% Kraton G1652, a styrene ethylene butylene styrene copolymer. The film also included an outer layer 26 of 95% Ecdel 9965 copolyester, and 5% of a master batch comprising 90% Ecdel 9965 and 10% of a stabilizer, Irganox 1010; and an adhesive layer 24 between the core layer 22 and outer layer 26 comprising a polymeric adhesive, Bynel E361.

The film had a total thickness of 9.5 mil.

Final pH was 4.68. This and other pH values given herein were determined by the procedure discussed later in this specification.

EXAMPLE 5

Multilayer Film (5% Ionomer)

A multilayer film was coextruded substantially like that in Example 4. The film differed in that the core layer consisted of 5% of the 90% neutralized ionomer (Example 1) and 95% of the Elvax EVA.

Final pH was 5.27.

EXAMPLE 6

Multilayer Film (5% Ionomer)

A multilayer film was coextruded substantially like that in Example 4. The film differed in that the core layer consisted of 10% of a mixture (half was the 76% neutralized K-Primacor 5990 ionomer from Example 2, and the other half was Elvax 3182-2) and 90% of the Elvax 3182-2. The total film thickness was 9.5 mil.

Final pH was 4.61.

EXAMPLE 7

Preparation of a Four Layer Film

FIG. 1 shows a four layer film in accordance with this invention. Sealing layer 20, which is the film layer which is in contact with the medical solution, is preferably a blend of 70–95% of an ethylene propylene copolymer (EPC) such as Fina Z9550 or Exxon PLTD 665 or other similar EPC which is blended with 5–50% of an elastomer. Preferred elastomers are styrene ethylene butylene styrene copolymer (SEBS) such as Kraton G1652; styrene butadiene styrene copolymer (SBS); styrene isoprene styrene copolymer (SIS); ethylene propylene monomer (EPM); or other similar modifier. "Sealant" is used herein to mean the layer facing the pH sensitive product. It includes materials or layers that are RF or heat sealable, or are otherwise sealed together.

The adjacent core layer 22 is preferably a blend of 5–50% of an alkali metal ionomer resin such as Surlyn 1707 available from DuPont which is blended with 50–95% EVA (e.g. Elvax 3182-2) or other EVA, especially EVA with between about 18% and 35% vinyl acetate (VA) by weight of the EVA. The Surlyn ionomer is able to neutralize acidic compounds produced by the carboxylate copolymer during autoclaving. The proportion of the ionomer can be varied in proportion to the quantity of soluble acidic compounds produced as well as the requirements of the enclosed medical solution.

The third layer 24 is an adhesive layer selected from a polymeric adhesive preferably such as acid or acid anhydride-modified forms of e.g. ethylene methacrylate copolymer (EMA), EVA, linear low density polyethylene (LLDPE), and other olefinic materials. Commercial examples include Bynel E361, Bynel E374, and Bynel E369.

The fourth outside layer 26 is preferably a flexible copolyester such as Eastman Ecdel 9967, Ecdel 9966, or Ecdel 9965, optionally with an appropriate stabilizer as needed.

EXAMPLE 8

Preparation of a Six Layer Multilayer Film

Figure 2:
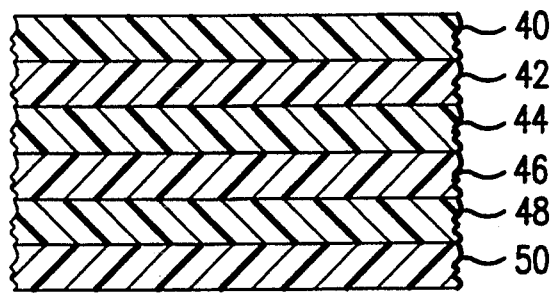
FIG. 2 is a schematic cross section of a six layer film made in accordance with the invention.

A six layer film embodiment, seen in reference to FIG. 2, has a sealant layer 40 similar in composition to sealant layer 20 described in Example 7 above.

An adhesive layer 42 of a non-EVA based polymeric adhesive is used to secure layer 40 to a pH control ionomer layer 44.

Layer 44 is constructed of an alkali metal based ionomer resin such as Surlyn 1707.

An adjacent core layer 46 preferably comprises EVA, especially one having 18 to 35% VA.

An adjacent adhesive layer 48 and outside layer 50 are constructed similar to layers 24 and 26 respectively as in Example 7 above.

EXAMPLE 9

Preparation of a Five Layer Multilayer Film

Figure 3:
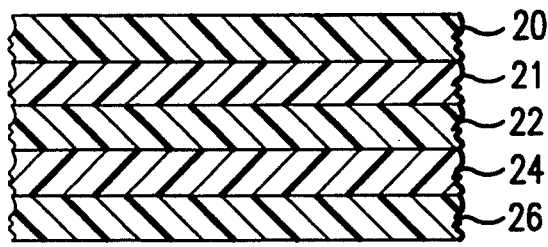
FIG. 3 is a schematic cross section of a five layer film made in accordance with the invention.

A five layer embodiment of the invention, seen in reference to FIG. 3, is similar in construction to Example 7 with the addition of a strength layer 21 positioned between sealant layer 20 and core layer 22. Strength layer 21 is preferably constructed of a blend of between 50 and 90% EPC (such as KS 409), 0 to 40% EVA, and 0.5 to 50% of an alkali metal based ionomer.

EXAMPLE 10

Preparation of a Five Layer Multilayer Film

Figure 4:
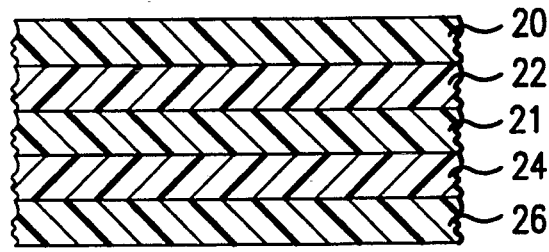
FIG. 4 is a schematic cross section of a five layer film made in accordance with the invention.

Example 10 is an additional five layer film embodiment as seen in FIG. 4. The composition of each film layer is identical to that seen in Example 9, the only difference being that the position of core layer 22 and strength layer 21 is reversed as seen in FIG. 4.

In three specific embodiments of Example 10, all three have a sealant 20, adhesive layer 24, and outer layer 26 which are the same in composition as those of Examples 4 and 5. The core layer 22 and strength layer 21 differ for each embodiment, and are as follows (refer to FIG. 4):

Ex.10 A:
layer 22=96.7% Elvax 3182-2+3.3% K-ionomer (from Example 3) layer 21=29% Elvax 3182-2+70% KS 409+1% K-ionomer (from Example 3)
Final pH was 4.91.

Ex.10 B:
layer 22=95.6% Elvax 3182-2+4.4% K-ionomer (from Example 3 )
layer 21=28.7% Elvax 3182-2+70% KS 409+1.3% K-ionomer ( from Example 3)
Final pH was 5.04.

Ex.10 C:
layer 22=94.4% Elvax 3182-2+5.6% K-ionomer (from Example 3)
layer 21=28.3% Elvax 3182-2+70% KS 409+1.7% K-ionomer (from Example 3)
Final pH was 5.14.

EXAMPLE 11

Preparation of a Five Layer Multilayer Film

Figure 5:
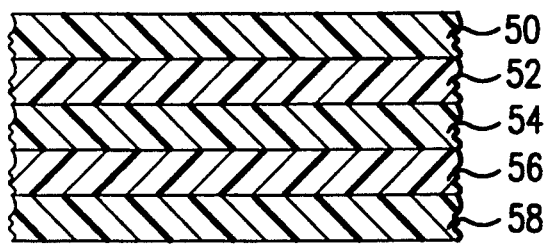
FIG. 5 is a schematic cross section of a five layer film made in accordance with the invention.

A further embodiment, as seen in FIG. 5, is a five layer film having a sealant layer 50 identical to sealant layer 20 seen in Example 7.

An adhesive layer 52 is provided which is either a non-EVA based adhesive, or alternatively, is a blend, preferably 50/50, of the EPC of sealant layer 50 and the material of core layer 54.

Core layer 54 is comprised of 75 to 97.5% very low density polyethylene (VLDPE) blended with 2.5 to 25% alkali metal ionomer.

An adhesive layer 56 and an outside layer 58 are constructed similar to layers 24 and 26 respectively, described in Example 7.

EXAMPLES 12-26

Preparation of a Hybrid Ionomer Multilayer Film

In further embodiments, as seen in reference to FIG. 1, are 4-layer films.

A sealant layer 20 is in each example provided with 79.9% ethylene propylene copolymer (PLTD 665, having a major proportion, i.e. more than 50% propylene, and a minor proportion, i.e. less than 50% ethylene); 20.0% SEBS (Kraton G1652); and 0.1% of an additive (AO 330).

The core layer 22 is in each example a blend of 80% EVA (Elvax 3182-2 having a vinyl acetate content of 28% by weight) and 20% of a commercial ionomer, in some cases further neutralized with an alkali metal hydroxide. These ionomers and hydroxides are identified below. Thus, the core layer composition is the variable in Examples 12 to 26.

A layer 24 comprises in each example a polymeric adhesive (Bynel E-361).

Outer layer 26 comprises in each example a blend of 95% copolyester (Ecdel 9965), and 5% of a blend of 90% Ecdel 9965 and 10% of a commercial stabilizer (Irganox 1010) .

The control film, for comparison purposes, was a film, 9.5 mils thick, having layers 20, 22, 24, and 26 as described above, but in which the core layer 22 had EVA (Elvax 3182-2) without the ionomer or ionomer/-hydroxide hybrid.

Medical storage pouches were constructed according to the above defined construction for Examples 12 to 26, and filled with 20 ml of water and 100 microliters of saturated potassium chloride. Three bottles of water, identified as A, B, and C, were used to fill three respective pouches for each composition (example). They had an initial pH of: A=5.56; B==5.63; and C=5.54. After three successive autoclaving cycles of 20 minutes each, at 250° F., pH was determined for the three samples of each of examples 12 through 24. The composition of the core layer of each example, and the average final pH of the autoclaved samples, are given below.

The materials shown in the brackets of some examples are the components that were reactively extruded to create the hybrid ionomer.

| Example | Core layer (each with 80% Elvax 3182-2 + 20% variable) | pH |
| --- | --- | --- |
| Control | 100% Elvax 3182-2 | 4.23 |
| 12 | 20% Surlyn 1707 (Na ionomer) | 4.90 |
| 13 | 20% [98.9% Surlyn 1707 (Na ionomer) + 1.1% KOH] | 5.16 |
| 14 | 20% [99% Surlyn 1707 (Na ionomer) + 1% NAOH] | 5.12 |
| 15 | 20% Surlyn 1601 (Na ionomer) | 5.17 |
| 16 | 20% [98.9% Surlyn 1601 (Na ionomer) + 1.1% KOH] | 5.72 |
| 17 | 20% Surlyn 1702 (Zn ionomer) | 4.19 |
| 18 | 20% [98.9% Surlyn 1702 | 4.34 |

-continued

| Example | Core layer (each with 80% Elvax 3182-2 + 20% variable) | pH |
|---|---|---|
| 19 | 20% [97.8% Surlyn 1702 (Zn ionomer) + 2.2% KOH] | 4.51 |
| 20 | 20% [98.67% Surlyn 1702 (Zn ionomer) + 1.33% NAOH] | 4.24 |
| 21 | 20% Surlyn 1605 (Na ionomer) | 4.36 |
| 22 | 20% [99% Surlyn 1605 (Na ionomer) + 1% NAOH] | 4.66 |
| 23 | 20% Surlyn 1650 (Zn ionomer) | 4.27 |
| 24 | 20% [99% Surlyn 1650 (Zn ionomer) + 1% NAOH] | 4.35 |
| 25 | 20% [98.9% Surlyn 1650 (Zn ionomer) + 1.1% KOH] | 4.48 |
| 26 | 20% [98.9% Surlyn 1706 (Zn ionomer) + 1.1% KOH] | 4.39 |

As seen in reference to the above described examples, which are provided for illustration only and are not limitations of the present invention, it is possible to provide a medical storage pouch which overcomes limitations of the prior art. By the addition of an alkali metal ionomer to the film layer containing a vinyl carboxylate copolymer, and/or as a distinct layer between the vinyl carboxylate and the sealant layer the carboxylic acid reacts with the ionomer. This reduces the migration of acidic compounds into a pH sensitive product contained in a pouch or other container made from film of the present invention.

Films in accordance with the present invention can be made by means and methods well known in the art, including conventional lamination, extrusion coating, flat die and tubular coextrusion. Films are typically cast, although for some applications these materials can be hot blown, and can also be oriented. For certain applications, the films are preferably irradiated to crosslink one or more layers of multilayer embodiments.

It should be noted that the Detailed Description and specific examples which indicate the present preferred embodiments of the invention are given by way of illustration only. Various changes and modifications within the spirit and scope of the claims will become apparent to those of ordinary skill in the art upon review of the above Detailed Description and examples.

What is claimed is:

1. In a film comprising a vinyl carboxylate copolymer layer, the improvement comprising the inclusion in said layer of an effective amount of an ionomer wherein between about 60% and 100% of the acid groups of the ionomer are neutralized.

2. The film of claim 1 and wherein said ionomer is neutralized by a hydroxide base.

3. The film of claim 2 wherein the hydroxide base is selected from the group consisting of sodium hydroxide and potassium hydroxide.

4. The film of claim 1 and wherein said ionomer comprises a hybrid ionomer.

* * * * *